Sept. 26, 1933.  J. L. ANDERSON  1,928,121
APPARATUS FOR TRIMMING PIPE
Filed March 28, 1930  4 Sheets-Sheet 1

INVENTOR
James L. Anderson
BY
ATTORNEY

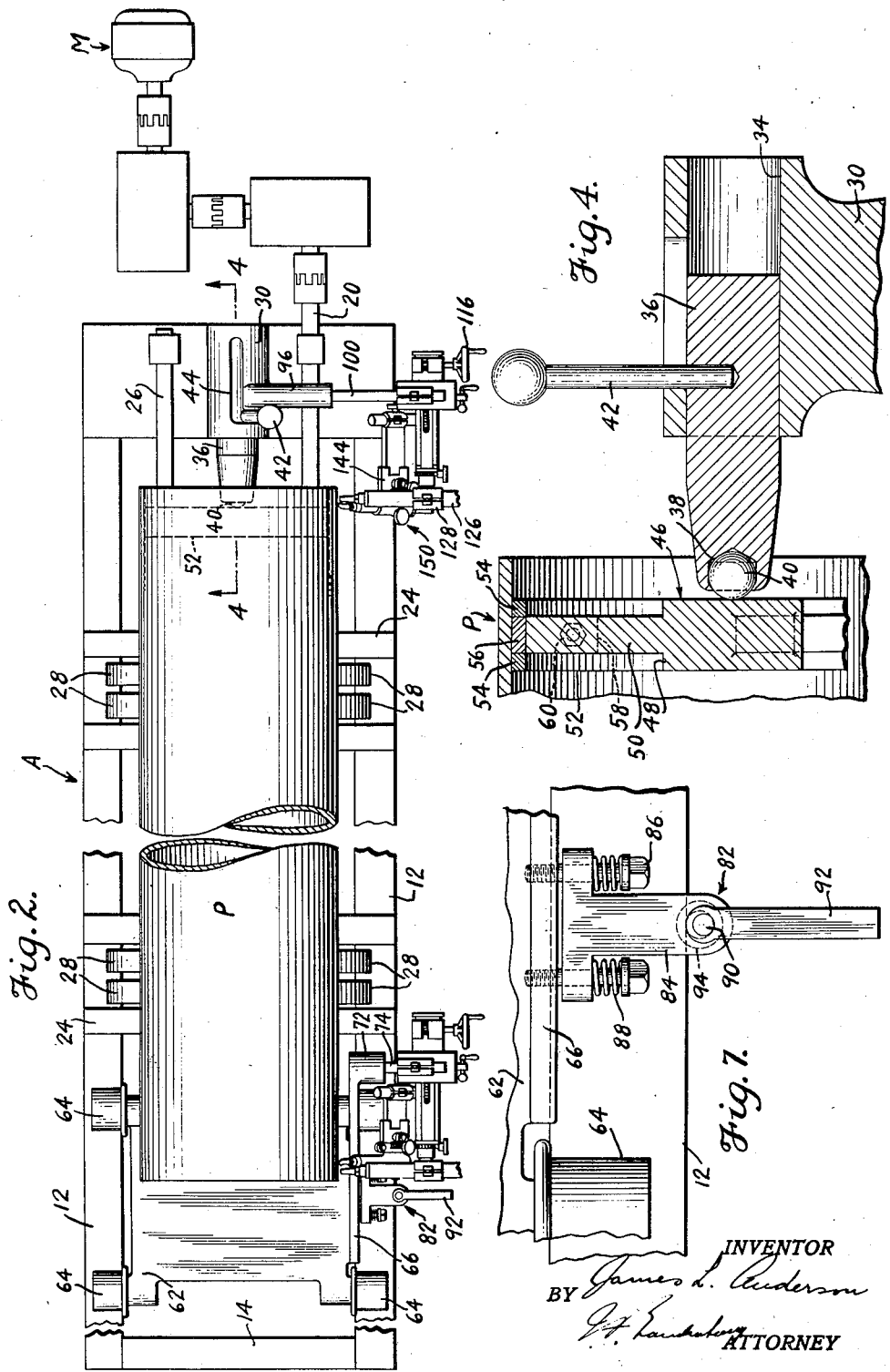

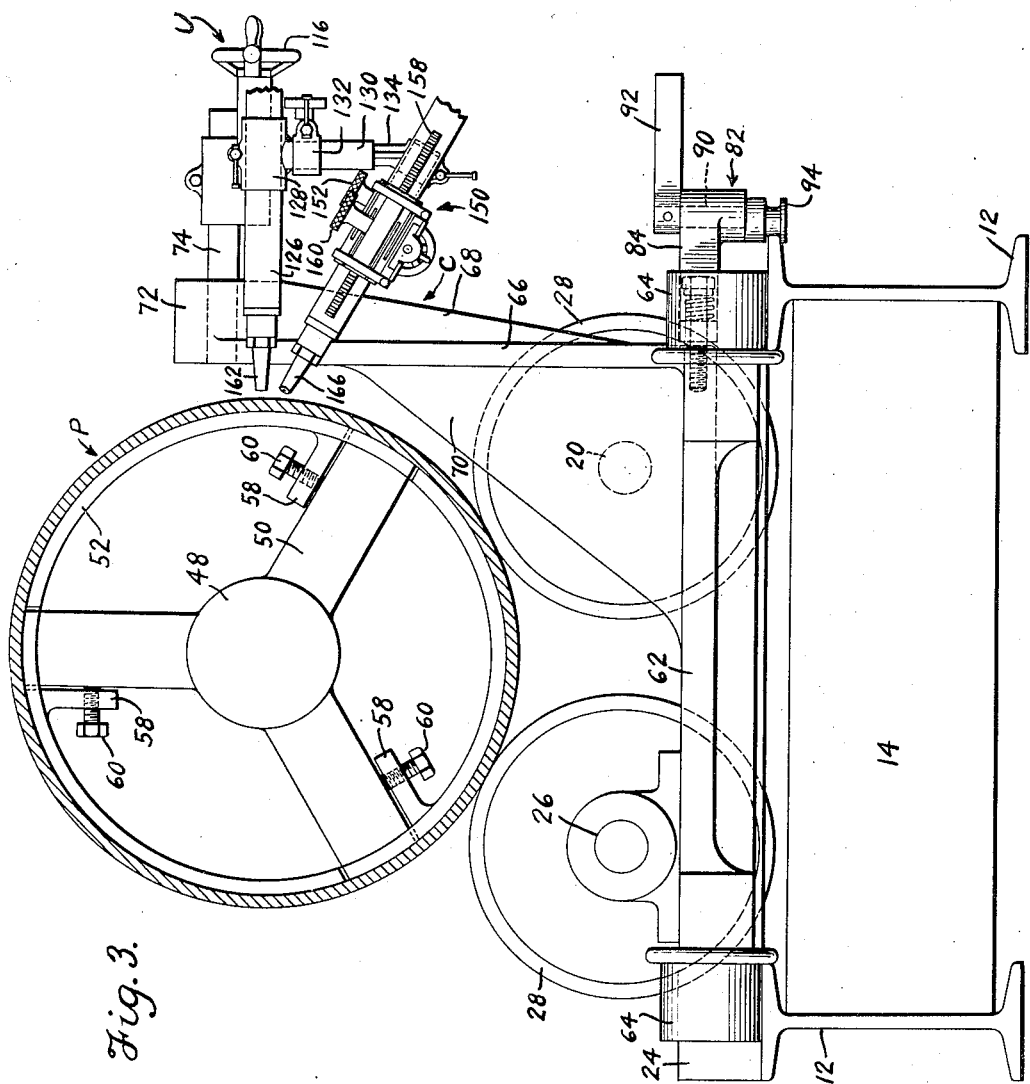

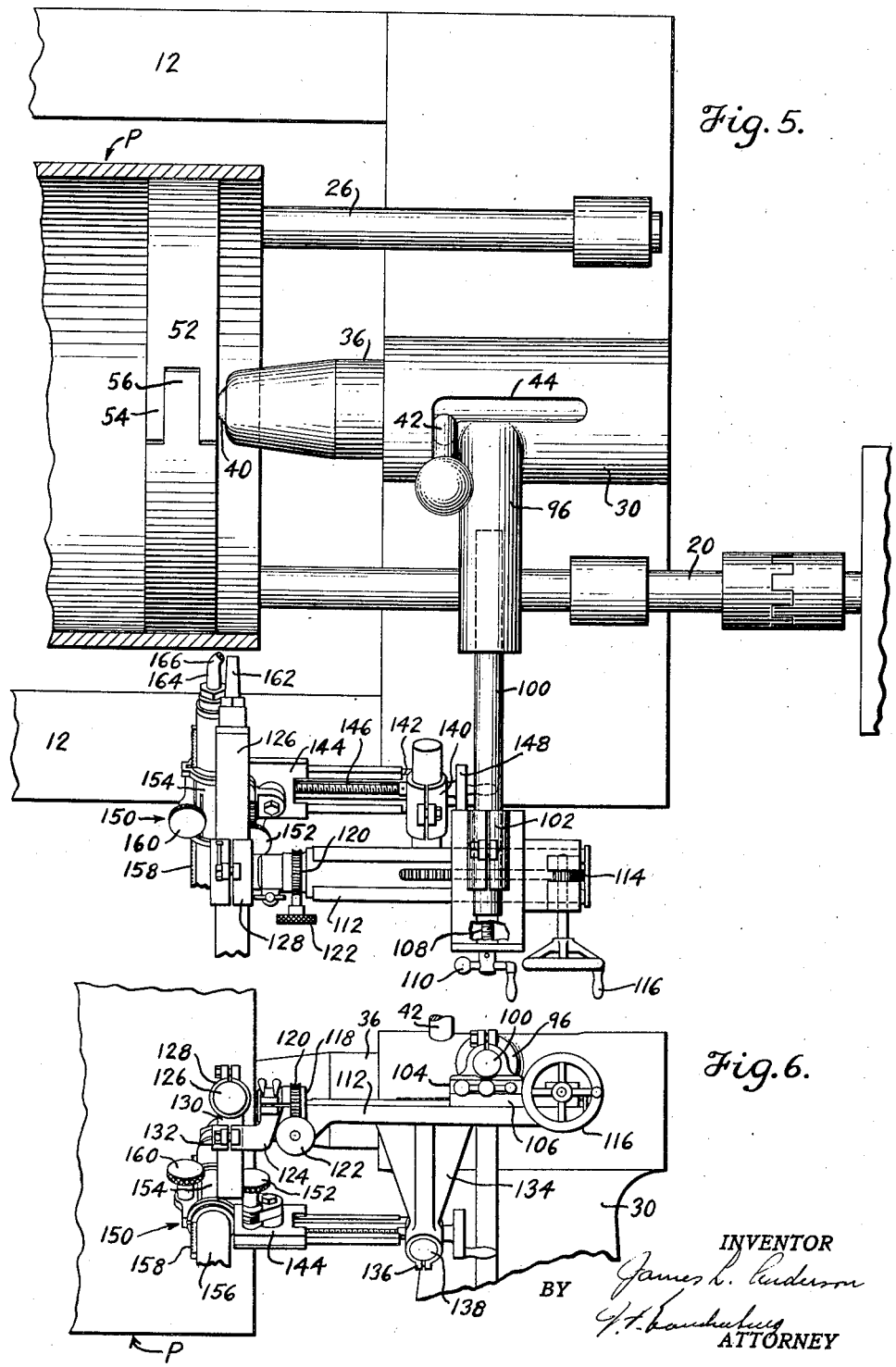

Patented Sept. 26, 1933

1,928,121

UNITED STATES PATENT OFFICE 1,928,121

APPARATUS FOR TRIMMING PIPE

James L. Anderson, Tenafly, N. J., assignor to Air Reduction Company, Incorporated, New York, N. Y., a corporation of New York Application March 28, 1930. Serial No. 439,616

17 Claims. (Cl. 266—23)

It is an object of this invention to provide apparatus for trimming pipe ends preparatory to welding a plurality of pipe sections together in end to end relationship. The invention relates to the use of thermal cutting devices, more particularly to the use of oxyacetylene cutting torches for the trimming operation, the torches being capable of disposition relative to the end edges of pipe sections, so that beveled or similar desired contours may be produced. Such edges may thereafter be abutted or approximated for the operation of welding two or more of such sections into a continuous member by fusing the edges together.

It is an object of this invention to provide means for trimming pipe ends, and for simultaneously providing the trimmed edge with a predetermined bevel of substantially the same dimensions throughout the extent of the edge.

It is desirable in most cases, in order to insure the proper relationship between the parts during welding, to form the end edges of the sections with a narrow surface substantially perpendicular to the axis of the pipe section, in addition to the beveled face. This requires the formation of the pipe end with at least two associated surfaces. In ordinary procedure, to trim the end edges of a pipe section and to provide the same with a bevel of a desired angular relation would require two distinct operations, producing two distinct cuts. To effect these two cuts and still present edges having a bevel of substantial uniformity and accuracy in the angle of bevel and relation of bevel depth to edge thickness, it has been found to be highly important that the trimming and beveling cuts progress simultaneously and in close proximity to each other.

During cutting, the metal is heated and expands; thereafter, the metal cools and contracts. It has been found, however, that the contraction is not of the same order as the expansion but is less, the metal assuming a permanent set. Forces are set up in the metal which tend to deform the edge being produced. These forces and the resultant deformations are in most cases of a small order. However, where it is necessary to relate to such deformations the relatively small dimension of metal thickness, it is readily apparent that a small error in the location of the tube or pipe edge to the beveling torch might produce error on a large scale in the ratio of beveled edge to the total edge. The deforming forces are not constant, depending upon many factors, such as the extent of metal on either side, the amount of metal already subjected to the stresses, speed of cutting and others which are unrelated and do not readily subject themselves to control. Irregularity in the dimensions of the bevel cut upon an edge of this character would appear, therefore, when the two cuts were carried forward independently.

When the beveling and trimming operations are carried forward simultaneously, with the two cutting jets fixedly positioned in relation and in close proximity to each other, the effect of the deforming forces is eliminated since if deformation does take place it affects simultaneously the relation of the pipe to both jets and does not affect the relation of such jets to each other. The slight deformation of the edge is not material for any other reason as the change in length is otherwise of too low an order to affect the welding operation thereafter to be performed. In order to make the cuts simultaneously, I utilize the method disclosed in the application of Harold J. Grow, filed November 30, 1929, Serial No. 410,672.

To effect the simultaneous trimming and edge beveling steps, a pipe section and a pair of cutting torches are mounted in proximate relation. The torches are positioned in the manner explained in application Serial No. 410,672, so that any predetermined combination of angularly disposed edge faces may be simultaneously cut when relative rotational movement of the pipe section and the torches is produced.

It is an object of this invention to provide apparatus of the type described in which the pipe section operated upon is easily handled, and positively retained in a fixed position of rotation without the use of any clamping mechanism. For the purpose of this invention, it is desired that the torches be retained substantially stationary and the pipe section be rotated. Also, to permit speedy loading and unloading of the trimming apparatus, the pipe section is supported upon and driven by a set of power-driven rollers. In order to retain the section in a predetermined set-up position relative to the cutting torches, the rollers, and therefore the section supported thereon, are tilted away from the horizontal so that the section may gravitate, as it is rotated, against a stop, which is advantageously provided by placing a readily removable member within the pipe and a ball-bearing abutment on the base. On rotation of the pipe section, the member within the pipe will come into contact with the abutment on the base, and so will restrain the pipe section against further longitudinal movement during the cutting operation. The abutment can be moved out of cooperative relation to permit the immediate removal of a pipe section from the rollers and the introduction of another.

It is an object of this invention to assemble the sets of torches so that they can be simultaneously fed toward, away from and along, and be adjusted vertically of, the pipe section without affecting the spacing or angular adjustment of the torches to each other. Means are provided which permits flexibility in the adjustment of the torches relative to each other or to said section, either during or before the cutting operation.

In order to make the trimming operation more efficient, it is preferred to cut both ends of a pipe section simultaneously. It is an object of this invention to provide apparatus whereby the two ends of a pipe section can be simultaneously trimmed and/or beveled. For this purpose, a carriage is mounted upon tracks relatively to the means for rotating the section, and is made the support for a set of torches which can be disposed relatively to the other end of the section, not in abutment with the stop. The apparatuses for the two sets of torch adjustments may be, and preferably are, identical.

Other features and objects of this invention will be apparent from the description and drawings of a preferred embodiment, made a part of this specification. The invention is not restricted to the particular construction and arrangement of parts herein shown and described, nor to the specific operations set forth, nor to the various details thereof, as the same may be modified without departing from the spirit and scope of the invention.

In the drawings:

Fig. 2 is a plan view of said apparatus, shown broken away;

Fig. 3 is an end elevational view of such apparatus, the pipe section being shown in cross-section;

Fig. 4 is an enlarged fragmentary sectional view, on the line 4—4 of Fig. 2, illustrating the construction and arrangement of the stops forming part of the apparatus;

Fig. 5 is an enlarged fragmentary detail plan view of the head post and the torch assembly carried thereby, as associated with a pipe section, the pipe being broken away in section;

Fig. 6 is a front elevational view of the portion shown in Fig. 5; and

Fig. 7 is a fragmentary plan view of means for retaining the carriage in a fixed position while restraining the carriage against material vibration.

Figure 1:
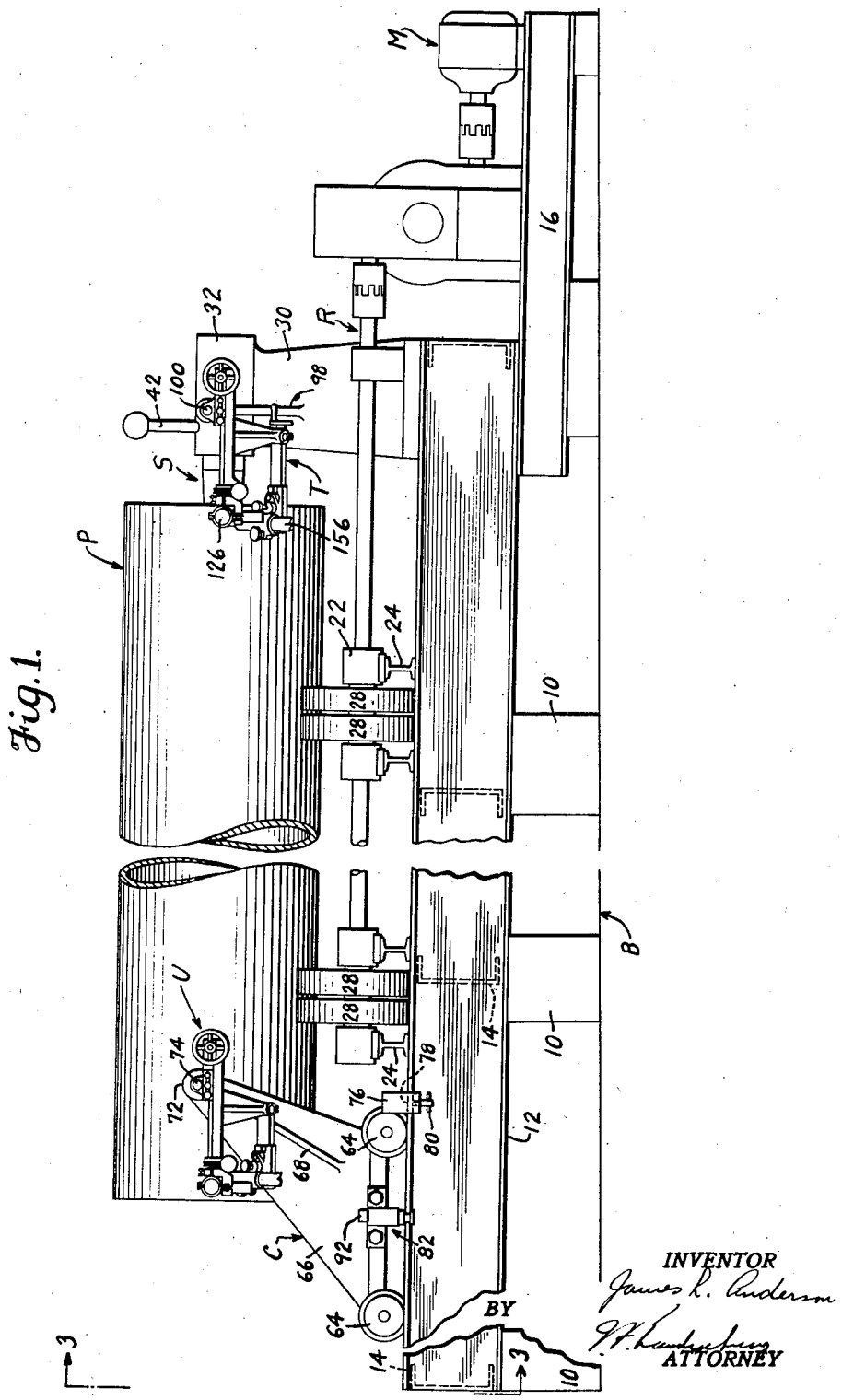
Fig. 1 is a front elevational view of apparatus, embodying the invention, the apparatus being shown broken away.

The illustrated apparatus has a base B, upon which is mounted the rotating drive R for supporting and rotating a pipe section P. A stop system S is assembled with the base and the pipe section. The drive R derives its power from a motor M. Supported upon the base are the torch assemblies T and U, one of which is stationarily located and the other supported upon a carriage C.

While the base of the apparatus is shown as being of a permanent nature, as seen from the foundations 10, it is possible and is contemplated to mount the apparatus upon skids to permit its easy and ready transportation from location to location, as in field use, for preparing pipe sections for the welding operations.

In the instant case, the foundations 10 support a pair of spaced apart I-beams 12, rigidly retained by the cross-members 14. The foundations are seen to be of decreasing height so that the I-beams are given a decided downward incline the lower end of the I-beams resting upon a platform 16, upon which the motor M is assembled. Through suitable couplings, reduction gearing and shafting, the motor transmits power to a shaft 20 of the rotating drive, carried in pillow blocks 22, resting upon I-beams 24, which extend transversely of and are mounted upon I-beams 12. Shaft 20 extends along the base at one side, a complementary shaft 26, similarly supported, extending along the opposite side of the base. If desired, a driven connection may be established between these two shafts by a chain belt or similar device. Mounted in spaced relation along the shafts are a plurality of wheels 28, preferably rubber-tired. Upon these wheels, the body of pipe section P is supported as upon a bed during a cutting operation. Owing to the frictional effect of the rubber-surfaced wheels, the pipe section, when not rotating, will be retained reliably in position; however, as rotation occurs, the section will tend to creep down the inclined way afforded by the disposition of base and of the axes of the rollers.

To restrain the section against such movement and thus positively to locate it in relation to the bed of the apparatus, without the necessity of supporting the pipe section in chucks, clamps or like devices, there is mounted at the lower end of the I-beams 12 a head post 30 the upper portion or head 32 of which is bored out, as at 34, for the reception of a slidable plug 36. The end of the plug toward the wheels is recessed, as at 38, for the reception of a ball 40, comprising an element of the stop system S, the outer end of the plug being spun over sufficiently to retain the ball loosely within the recess. An arm 42 secured in the plug extends from the head through an L-shaped slot 44. For cooperation with the plug there is provided a stop 46 which is inserted within the bore of the pipe section. The stop consists of a disk center 48 from which radiate a plurality of arms 50. At the outer end of each arm there is secured an arcuate spring segment 52, the connection being made in any suitable manner. The segments are shaped and are of sufficient length to present an unclosed ring slightly less in diameter than the bore of the pipe to be handled. The free end of each segment is bifurcated, as seen at 54, for the reception within the prongs thus formed of the reduced end 56 of the next adjacent spring segment at the point where it is secured to the end of an arm. By the interlock of the bifurcation 54 and the reduced end 56, the segments are retained substantially rigidly in true circular relation.

Immediately behind the bifurcation, an inwardly extending boss 58 is provided on each spring segment, extending substantially parallel to the adjacent arm and having a set-screw 60 for engagement with said arm. By tightening the set-screws, the segments are compressed outwardly against the walls of the pipe section bore, and thus act to retain the stop firmly in position within the pipe.

The stop 46 is assembled with a pipe section at a position removed sufficiently inwardly of the end edge of the section, so that the heat from the cutting operation will not have any material effect upon the stop. The plug 36 is advanced in bore 34 until arm 42 registers with the foot of the L-shaped slot. The arm is then moved into the foot of the slot and locked therein to retain the ball 40 in set-up position. The pipe section is now mounted upon wheels 28 and upon rotation thereof will drift down the incline until the disk center abuts the ball 40. The section will continue to rotate, but the longitudinal movement thereof relative to the base will be entirely halted by the coaction of stop and plug, and of course the section will not shift uphill. It is of no material importance whether the ball 40 is exactly centered upon the disk center 48. Pipe sections of different diameters within the limits set by the disk may therefore be handled by means of the same head-post and plug. However, suitable means may be provided, if desired, to bring the ball into alinement with the center of rotation of the disk.

At the upper end of I-beams 12, carriage C is mounted for longitudinal movement. The carriage consists of a base 62 formed to provide bearings for flanged wheels 64 which are spaced apart sufficiently so that the upper surface and inner edges of the top flanges of I-beams 12 may be used as a track-way. At one side of the base there rises a bracket arm 66, the uppermost portion of which extends beyond the front side of said base. Arm 66 is reinforced by ribs 68 and 70 and has formed at the uppermost portion thereof a boss 72, in which is received the support arm 74 for the torch assembly U.

To retain the carriage against movement down the incline, when the apparatus is in operation, and also to predetermine the position of assembly U for successive operations, a block 76 is mounted upon the outer edges of the flanges of I-beam 12 by reception of such flange within a slot 78 cut in the block; the body of the block then extends across the path of wheels 64 and a set-screw 80 may be used to anchor the block in a desired position.

To retain the carriage and the apparatus carried thereby against vibration during operation, and also to provide a device for positively retaining the carriage against any rolling or sidewise movement, the clamping device 82 is employed. A T-headed arm 84 is slidably mounted on a pair of bolts 86 secured in and extending from the side of base 62 and is normally pressed against the base by springs 88 received between the heads of the screws and the cross-member of the arm. At the outer end of the arm is formed a bearing for a shaft 90 to the extending ends of which are secured the handle 92 and the flanged eccentric crank 94. The rotation of handle 92 brings the crank into pressure contact with the outer edge of the flange of the I-beam, so that the flange of the wheels 64 on that side of the apparatus will be brought into sharp gripping engagement with the inner edge of the I-beam flange. The springs 88 allow sufficient play to gain maximum movement of the eccentric crank and allow of ready separation of the crank and the flange to permit movement of the carriage.

Preferably integrally cast with head 32 of head-post 30 is a cylindrical boss 96, strengthened by a rib 98 integral with the head-post. The boss is formed to receive the support arm 100 for torch assembly T.

The torch assemblies T and U are substantially identical and the description of one will disclose in detail the construction of the other. A split sleeve 102 mounts each of the torch assemblies on its respective support arm. The sleeve, which can be clamped in position on said arm, forms a part of a head 104 and permits rotation of the latter and of apparatus carried thereby, so that different elevational relationships of pipe section and torches can be attained. In this manner, the torches can be positioned in different cutting relationships vertically of the same pipe section, or in the same cutting relationship with pipe sections of different diameters. In the under surface of head 104 is formed a machine way for cooperation with a complementary machine way in a block 106. A screw and nut mechanism 108, operated by a hand lever 110, may be used to obtain graduated movement of said block relative to said head, the movement being lengthwise of the support arm and transverse of a pipe section supported upon the apparatus.

Machine ways between block 106 and an arm 112 permit relative sliding movement. A rack and pinion mechanism 114, actuated by the hand-wheel 116, provides for controlled movement of the torches transverse to the support arm and lengthwise of the pipe section. The outer end of the arm may be formed as a bearing to receive a rotatable sleeve 118, upon which is positioned a worm gear 120 for cooperation with a worm (not shown) operated by a thumb wheel 122 supported by said arm. An arm 124 carried by sleeve 118 is thereby rotated for positioning a torch 126, which is clamped in a sleeve 128, formed with or secured to a post 130, the latter being retained by a split sleeve 132 on the end of arm 124. Torch 126 can be slid through sleeve 128 to position its tip at the proper distance from the section to be cut, and can be rotated in different planes, either by use of the worm gear 120, or by manipulation at the sleeve 132, or in the sleeve 128.

Secured to and extending down from arm 112 is a reinforced bracket 134, at the lower end of which the split boss 136, directed angularly upward, receives a post 138, upon which the split sleeve 140 of an arm 142 is mounted. A head 144 has machine way mounting on said arm and may be fed relatively thereto by means of a screw and nut mechanism 146, actuated by the hand wheel 148. On the head is secured the torch mounting 150, which has a thumb-screw 152 for actuating a worm and gear mechanism (not shown) to effect rotational movement of a sleeve 154 transverse of the arm. Sleeve 154 forms a part of mounting 150, and is adapted to have mounted therein a torch 156. A rack 158 upon the torch body, engaged by a gear (not shown) housed within the mounting and actuated by thumb-wheel 160, can be actuated to feed the torch axially toward and away from the pipe section.

It will be seen that by means of the adjustment at sleeve 102, simultaneous vertical adjustment of both torches may be produced, while by actuation of the mechanism 108 or the mechanism 114, simultaneous adjustment of both torches transverse or lengthwise, respectively, of the pipe section can be effected. Independent adjustment of the torch 156 lengthwise of the pipe section and relative to the torch 126 is effected by mechanism 146, while the relative angularity of the torches can be changed by independent adjustments at such points as post 130 and sleeve 132, thumb-wheel 122 and thumb-screw 152. The axial adjustment of torch 156 provides also for an independent adjustment of said torch transverse of the pipe section.

By the various adjustments provided for the torches, it is possible to arrange the jets issuing therefrom so that no jet will be required to act across an air gap within the work, as set forth in the aforementioned application. It is intended that one jet should slightly lead the other in each set, so that the second jet will benefit from the heating effect of the leading jet and will not have to traverse an air space in the metal in order to cut which it is intended to form, the waste gas from this jet affecting only waste material. The particular relation of the jets has been dealt with fully in application, Serial No. 410,672.

The tips 162 and 164 of the torches 126 and 156, respectively, may be of identical design, having the ordinary arrangement of preheating and oxidizing jets. However, for economy of gases, only one of the tips need be provided with preheating jets. Such tip would be the leading tip, which would be determined in accordance with the cut to be made.

Where a series of cuts of the same relative angularity are to be made, either or both of the tips may be provided with a bent end 166 to fix the direction of the jet or jets issuing therefrom in predetermined angles to the work. Such bent end will reduce the awkwardness of positioning the torch bodies relatively to the work where angles of considerable magnitude are dealt with. It is also contemplated to effect any such fixed series of cuts by means of one torch having a plurality of tips, disposed in proper relation to each other for any particular cutting and beveling operation. In such case, the apparatus carried by bracket 134 might be eliminated.

In operation, with the motor shut down and the plug 36 retracted into its bore so that the arm 42 rides in the longitudinal portion of slot 44, a section with a stop 46 mounted therein is arranged upon the wheels 28. It is understood that the assemblies T and U previously would have been removed out of the way of such section, either by racking the portions out of the vicinity, in the case of the former, or by moving the carriage along the base, in the case of the latter. The plug is now advanced to its set position, the motor energized, and the torch assemblies positioned relatively to their respective ends. The carriage C is brought against the block 76, the clamping device 82 is forced into engagement with the beam flange, and the torches are adjusted to any desired relationship; the cuts at the two ends of the section are preferably commenced simultaneously. Where the edge to be produced by the cutting apparatus does not lie entirely within one plane, it is possible to produce the desired cut by feeding the assembled torches longitudinally of the pipe section by means of the mechanism 116 as the section is rotated. For such operation, it would be necessary to have the section marked according to some preliminarily prepared template. When the cut has been completed, the torches are shut down, the clamping device 82 is released, the carriage C and its torches are rolled away from the end of the pipe section and retained in such position by use of the device 82, and the assembly T is moved out of the way. The motor is stopped and the plug rotated out of its set position. The section is then removed, another is placed in position, and the operation is repeated.

As many changes could be made in the above construction and the methods of operation involved, and many widely different embodiments of the invention designed without departing from the scope of the invention as defined in the accompanying claims, the matter contained in the above description or shown in the drawings should be considered as illustrative of an operative embodiment of the invention and not in a limiting sense.

I claim:

1. In combination, apparatus for effecting rotational movement of a pipe section supported thereby, said apparatus being constructed so that a pipe section supported and rotated thereby will gravitate endwise, means opposed to such gravitational movement to position said section in predetermined relation, means for rotating the section, and means for cutting the rotating section.

2. In combination, means for projecting a cutting gas jet, and apparatus for supporting and effecting rotational movement of a pipe section relatively to said jet, said apparatus being constructed to locate said section in a predetermined relation to said jet by a component of gravitational force acting lengthwise of said section.

3. In apparatus of the character described, a bed for freely supporting and imparting continuous, uniform rotational movement to a pipe section; driving mechanism connected with said bed; means cooperating with said supporting means to effect the positioning of an end of the pipe section in a predetermined relationship, and means associated with said supporting means for cutting said section at a predetermined distance from said end, said cutting means consisting of a device for projecting a plurality of angularly related and proximate oxygen jets at said section during the rotation of the latter, means for adjusting said jets simultaneously both longitudinally and transversely of said section without disturbing their set up relationship, and means for adjusting the angular relationship of said jets.

4. In apparatus of the character described; a bed for freely supporting and imparting continuous, uniform rotational movement to a pipe section; driving mechanism connected with said bed; means cooperating with said supporting means to effect the positioning of an end of a pipe section in a predetermined relationship; and means associated with said supporting means for cutting said section at a predetermined distance from said end, said cutting means consisting of a device for projecting a plurality of angularly related and proximate oxygen jets at said section during the rotation of the latter, means for simultaneously adjusting said jets relatively to said section without disturbing their set up relationship, and means for adjusting the jets relatively to each other.

5. In apparatus of the character described; a bed for freely supporting and imparting continuous, uniform rotational movement to a pipe section; driving mechanism connected with said bed; means cooperating with said supporting means to effect the positioning of an end of a pipe section in a predetermined relationship; and means associated with said supporting means for cutting said section at a predetermined distance from said end, said cutting means consisting of a device for projecting a plurality of angularly related and proximate oxygen jets at said section during the rotation of the latter, said jets being adjacent each other but spaced in the direction of rotation.

6. In apparatus of the character described; a bed for freely supporting and imparting continuous uniform rotational movement to a pipe section; driving mechanism connected with bed; means cooperating with said supporting means to effect the positioning of an end of a pipe section in a predetermined relationship; and means associated with said supporting means for cutting said section at a predetermined distance from said end, said cutting means consisting of a device for projecting a plurality of angularly related and proximate oxygen jets at said section during the rotation of the latter, and means for simultaneously adjusting said jets longitudinally of said section without disturbing their set up relationship.

7. In apparatus of the character described; a bed for freely supporting and imparting continuous uniform rotational movement to a pipe section; driving mechanism connected with said bed; means cooperating with said supporting means to effect the positioning of an end of a pipe section in a predetermined relationship; and means associated with said supporting means for cutting said section at a predetermined distance from said end, said cutting means consisting of a device for projecting a plurality of angularly related and proximate oxygen jets at said section during the rotation of the latter, and means for simultaneously adjusting said jets transversely of said section without disturbing their set up relationship.

8. In apparatus of the character described; a bed for freely supporting and imparting continuous, uniform rotational movement to a pipe section; driving mechanism connected with said bed; means cooperating with said supporting means to effect the positioning of an end of a pipe section in a predetermined relationship; and means associated with said supporting means for cutting said section at a predetermined distance from said end, said cutting means consisting of a device for projecting a plurality of angularly related and proximate oxygen jets at said section during the rotation of the latter, and means for adjusting the angular relationship of said jets.

9. In combination, a base, means on said base for receiving and rotating a pipe section, cooperating stops carried by said base and said section, said base and said receiving means being disposed to bias a section supported thereon out of the horizontal to bring said stops into contact for determining the position of said section lengthwise, and means mounted on and shiftable along said base, said means carrying a device for cutting said section as the latter rotates.

10. Means for cutting a pipe section to a predetermined length and simultaneously forming the end edges thereof to a predetermined contour which comprises: means for imparting rotational movement to a pipe section, means for automatically positioning the section in a fixed relation lengthwise, means for attacking one end of said rotating pipe section by an oxygen jet to bevel the end, and additional oxygen-jet delivering means supported in fixed relation to the positioning means to cut said rotating section to predetermined length.

11. In apparatus of the character described; a bed for freely supporting and imparting continuous, uniform rotational movement to a pipe section; driving mechanism connected with said bed; means cooperating with said supporting means to effect the positioning of an end of a pipe section in a predetermined relationship; and means associated with said supporting means for cutting said section at a predetermined distance from said end.

12. In apparatus of the character described; means for freely supporting and imparting continuous, uniform rotational movement to a pipe section; means cooperating with said supporting means to effect the positioning of an end of a pipe section in a predetermined relationship; and means associated with said supporting means for simultaneously trimming both ends of the pipe section.

13. In combination, a base, rollers on said base for freely supporting and rotating a pipe section, a motor geared to said rollers, cooperating stops carried by said base and said section, said base and said receiving means being disposed to bias a section supported thereon out of the horizontal to bring said stops into contact for determining the position of said section longitudinally of said base, and means mounted on said base for cutting said section while the latter is rotated.

14. In combination, a base, rollers on said base for supporting a pipe section with its axis substantially parallel to the axis of the rollers, a motor geared to the rollers for rotating said rollers and the pipe section supported by the rollers, means for limiting sliding axial movement of the pipe section on the rollers including cooperating stops carried by said base and said section for determining a fixed position of said section longitudinally of said base, and means mounted on said base for cutting said section while the latter is rotated.

15. In combination, a base, a bed on said base for reeciving and rotating a pipe section, means on said base and cooperating means adapted to be fixed inside said section for determining a fixed position of said section longitudinally of said base, and means mounted on and movable along said base, said means carrying a device for cutting said section as the latter rotates.

16. In combination, a base, means on said base for receiving and rotating a pipe section, means on said base and cooperating means adapted to be fixed to said section for determining the position of said section longitudinally of said base, and means mounted on said base for cutting said section while the latter is rotated by said receiving means.

17. A pipe cutting machine having bed rollers on laterally spaced axes to support and rotate a pipe section resting thereon, power drive mechanism connected with said rollers, means for restraining a pipe section on the rollers against endwise displacement, and means for supporting a cutting torch in relation to the pipe section.

JAMES L. ANDERSON.